United States Patent [19]
Ray

[11] 4,153,067
[45] May 8, 1979

[54] METHOD AND APPARATUS FOR PROVIDING REMOVABLE SERVICE TO CONNECTIONS TO A HIGH PRESSURE MAIN

[76] Inventor: Charles W. Ray, 5615 Heatherview Dr., Fort Wayne, Ind. 46808

[21] Appl. No.: 765,521

[22] Filed: Feb. 4, 1977

[51] Int. Cl.² .............................................. F16l 55/10
[52] U.S. Cl. ................................... 137/15; 29/401 C; 137/315; 138/92; 138/94; 138/97; 285/3
[58] Field of Search ................ 29/401 C, 401 R, 402; 137/15, 315, 318, 319, 320, 321, 322; 138/89, 92, 94, 96, 97; 220/288; 285/3, 4

[56] References Cited

U.S. PATENT DOCUMENTS

| | | | |
|---|---|---|---|
| 2,110,003 | 3/1938 | Mample | 138/97 |
| 2,482,687 | 9/1949 | Mueller et al. | 138/89 |
| 2,911,001 | 11/1959 | Fuller | 138/89 |
| 3,157,203 | 11/1964 | Ver Nooy | 138/89 |
| 3,237,638 | 3/1966 | Rothenberg | 137/319 |
| 3,302,493 | 2/1967 | Huslander et al. | 137/318 |
| 3,410,522 | 11/1968 | Daghe et al. | 137/318 |
| 3,626,576 | 12/1971 | Ray | 137/318 |
| 3,674,055 | 7/1972 | Ray | 138/89 |
| 3,814,276 | 6/1974 | Gordon et al. | 220/288 |

Primary Examiner—Martin P. Schwadron
Assistant Examiner—G. L. Walton

Attorney, Agent, or Firm—Gust, Irish, Jeffers & Rickert

[57] ABSTRACT

A sacrificial top tap T and the method of using such a T to tap into a main supply pipe in such a manner that the T may ultimately be plugged and the greater portion thereof removed from the main supply pipe in such a manner as to protect the remaining T portion and the main supply pipe itself from potential damage. The Service T has an axial through bore and a lateral outlet with means near one end of the T for connecting the T to a main and means near the lateral outlet for connecting the T to a service line. Remote from the one end which connects to the service line may be located a sealing element and threads are provided inside the bore near the end which attaches to the main supply pipe for receiving an element for sealing that bore when the service line is to be disconnected. When disconnecting the service line, the Service T interior is sealed against the passage of material from the main and at a point close to the main. A portion of the Service T is severed from the main in a region more remote from the main than the point of sealing and the unsevered or remaining portion of the Service T is capped for example, by welding a cover over that unsevered portion and to the main. The above steps may be carried out while maintaining the pressure within the main above atmospheric pressure.

5 Claims, 4 Drawing Figures

U.S. Patent  May 8, 1979  4,153,067
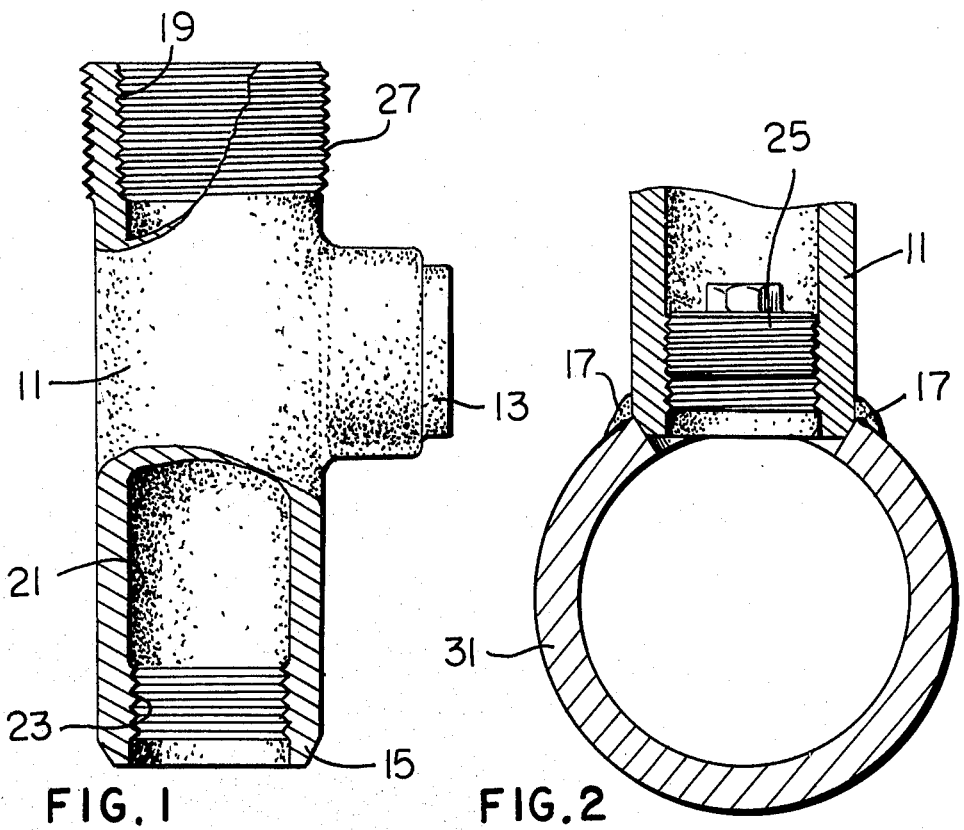
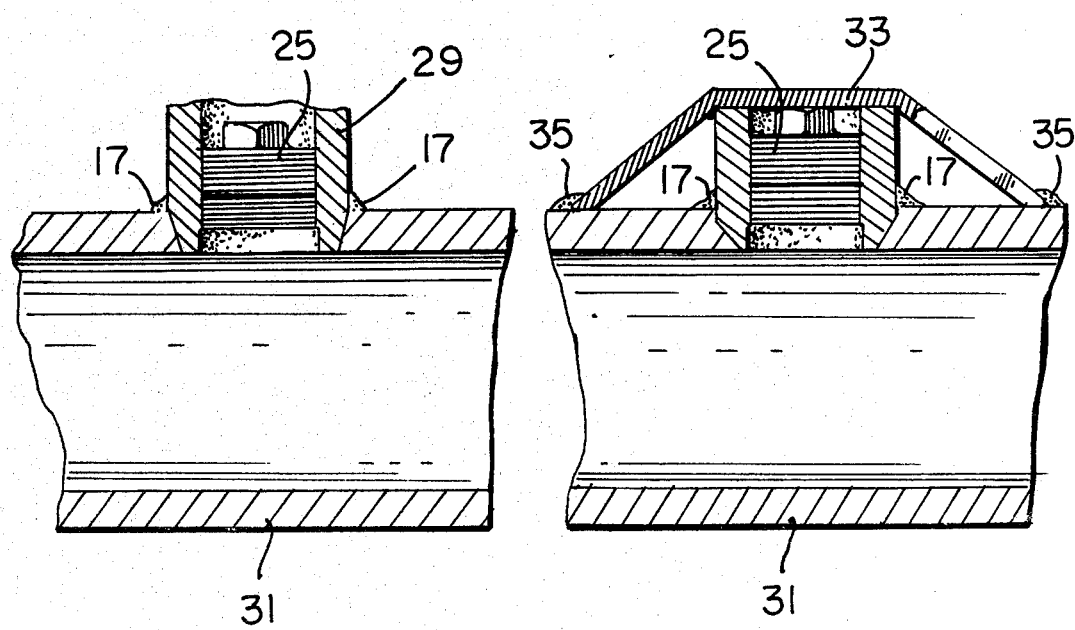
FIG. 1
FIG. 2
FIG. 3
FIG. 4

METHOD AND APPARATUS FOR PROVIDING REMOVABLE SERVICE TO CONNECTIONS TO A HIGH PRESSURE MAIN

BACKGROUND OF THE INVENTION

The present invention relates generally to fluid distribution systems and more particularly to an improved system employing a Service T to couple a service line to a main supply line.

Service T's as such, are well known and widely used for connecting a gas or water main supply pipe to a service line for a customer. Such Service T's are typically welded to or threaded into the main supply pipe and have a lateral branch outlet which connects to the service line. This allows use of the through bore for drilling into the main or for inserting valves into the through bore from the opposite end of the T. Such systems are more fully described in U.S. Pat. No. 2,482,687 as well as my U.S. Pat. No. 3,674,055.

While such prior art Service T's perform well their intended function, and allow the installation, maintenance and repair of the system while maintaining the pressure within the main supply pipe above atmospheric pressure so as to not interrupt service to other users in those situations where use of a service line has been discontinued, the physical presence of the Service T, which extends from the main supply line in a precarious manner, may give rise to maintenance problems. For example, when digging in the area of a buried main supply pipe, the Service T, which extends therefrom, may be inadvertently struck with a backhoe or other digging equipment and when so struck not only is the Service T broken but frequently a large portion of the main supply pipe is broken out along with the Service T.

SUMMARY OF THE INVENTION

Among the several objects of the present invention may be noted the provision of a Service T which may be partially removed when a service line is taken out of service; the provision of a method of removing the major portion of a Service T while maintaining the integrity the sealing of the main supply line against leakage; the provision of a scheme for protecting a main supply pipe plug against mechanical damage; and the provision of a sacrificial Service T for connecting a main supply pipe to a service line including a method of removing the Service T from the main.

In general a non-conventional Service T is attached to a main in a conventional manner and is used in conventional manner, however, when it is desired to take the Service T out of service, the Service T interior is sealed against the passage of material from the main at an area close to the main and a portion of the Service T severed from the main at an area more remote from the main than the area of sealing. The unsevered portion of the Service T is then capped for example, by placing a cover over the unsevered Service T portion and securing the cover to the main so that the portion remaining with the main is of a low profile and not easily damaged.

Also in general, and in one form of the invention, a sacrificial Service T for conne ting a main supply pipe to a service line has an axial through bore and a lateral outlet with one end of the Service T to be connected to the main and the lateral outlet of the T to be connected to a service line. Threads for a sealing element may be provided near the end of the Service T remote from the main and interior threads are provided in the Service T bore near the main for receiving an element for sealing the through bore when the service line is to be connected. When disconnecting the service line, a threaded plug would typically be passed through the Service T bore from the end remote from the main and sealingly disposed within the interior thread so that the major portion of the Service T may be cut off and a protective cover optionally affixed to the main supply pipe to overlie and protect the remaining portion of the Service T and its threaded plug.

BRIEF DESCRIPTION OF THE DRAWING

FIG. 1 is a side view partially in section of a sacrificial Service T according to the present invention;

FIG. 2 is an end view of the main supply pipe with the lower portion of the Service T connected thereto and plugged;

FIG. 3 is a side view of the main supply pipe and plug of FIG. 2 illustrating the unsevered portion of the Service T, the remainder of the Service T having been cut off; and FIG. 4 is a side view similar to FIG. 3 but illustrating the application of a cover to overlie and protect the unsevered Service T portion.

The exemplifications set out herein illustrate the preferred embodiment of the invention in one form and such exemplification is not to be construed as limiting the scope of the disclosure or the invention in any manner. Throughout the several views of the drawing corresponding reference characters indicate corresponding parts.

DESCRIPTION OF THE PREFERRED EMBODIMENT

In FIG. 1, the sacrificial Service T 11 has a portion 13 about its lateral outlet for connecting the T to a service line. This portion might be threaded or merely a portion of the T to which the service line will be welded. Similarly, the T 11 has a portion 15 for attaching the T to a main supply pipe which again could be external threads along the T or merely a portion of the T which is to be attached to the main by a weld bead 17 as illustrated in FIG. 2. In addition to the lateral outlet to be connected to a service line, the service T has a vertically extending through bore having upper internal threaded portion 19, a central passage portion 21 and lower internal threaded portion 23 of progressively smaller diameters so that a plug 25 may be passed down the T and into engagement with the threaded portion 23.

In addition to the interior upper threaded portion 19, the T 11 also has an exterior upper threaded portion 27. These two threaded portions allow the T to be used in conventional fashion for example, valves such as disclosed in my aforementioned patent may be used in conjunction with the T 11 and further various commercially available equipment such as drilling machines and stopping off devices may be used in conjunction with the T 11 to allow drilling and plugging of the main supply pipe while maintaining service to other customers, that is maintaining the pressure within the main supply pipe above atmospheric pressure.

When it is desired to permanently disconnect the service line from the main, plug 25 is passed down through the T and into sealing engagement with the threads 23 as illustrated in FIG. 2. Thereafter, a portion of the T is severed from the main at a point along the T more remote from the main than the plug 25. The unsevered portion 29, which remains integral with the main supply pipe 31, may then have cover 33 placed thereover and that cover 33 affixed to the main supply pipe 31 for example, by welding cover 33 to the pipe 31 along the weld bead 35. The cover 33 overlies and protects the threaded plug 25 and unsevered portion 29 and may, for example, be contoured as a blister or dome to not only fit the main pipe 31 but also overlie the remaining portions of the Service T.

From the foregoing it is now apparent that a novel sacrificial Service T as well as a novel method of removing a Service T from service have been disclosed and meeting the objects and advantageous features set out herein as well as others. Numerous modifications will suggest themselves to those of ordinary skill in the art and accordingly the scope of the present invention is to be measured only by that of the appended claims.

What is claimed is:

1. A sacrificial Service T for connecting a main supply pipe to a service line, the Service T having an axial through bore and a lateral outlet, means near one end of the Service T adapted for connecting the Service T to a main, means near the lateral outlet for connecting the Service T to a service line, means near the end of the Service T remote from said one end for receiving a sealing element, and interior thread means near the said one end only for receiving a threaded plug for sealing the through bore when the service line is to be disconnected and the service T permanently severed, the diameter of the through bore including the means near the remote end of the Service T being greater than the diameter of the threaded plug and than the diameter of the interior thread means whereby the threaded plug may be inserted in and removed from the interior thread means through the bore from the end of the Service T remote from said one end and a protective cover affixable to the main supply pipe to overlie and protect the remaining severed portion of the Service T that contains the threaded plug.

2. The method of permanently severing a Service T from a main comprising:
   sealing the Service T interior against the passage of material from the main at an area close to the main said sealing includes screwing a plug into the Service T;
   permanently severing a portion of the Service T from the main at an area more remote from the main than the area of sealing; and
   capping the unsevered portion of the Service T, the step of capping including placing a cover over the unsevered Service T portion at the area close to the main and securing the cover to the main.

3. The method of claim 2 wherein the step of securing includes welding the cover to the main.

4. The method of permanently severing a Service T from a main comprising:
   sealing the Service T interior against the passage of material from the main at an area close to the main said sealing includes screwing a plug into the Service T;
   permanently severing a portion of the Service T from the main at an area more remote from the main than the area of sealing;
   capping the unsevered portion of the Service T, the step of capping including placing a cover over the unsevered Service T portion at the area close to the main and securing the cover to the main; and
   maintaining the pressure within the main above atmospheric pressure during the sealing, severing and capping steps.

5. A sacrificial Service T for connecting a main supply pipe to a service line, the Service T having an axial through bore and a lateral outlet, means near one end of the Service T adapted for connecting the Service T to a main, means near the lateral outlet for connecting the Service T to a service line, means near the end of the Service T remote from said one end for freely receiving a sealing element, interior thread means near the said one end only for receiving the element for sealing the through bore when the Service T is to be permanently severed the sealing element comprising a threaded plug disposed within the interior thread means and sealing the through bore, and a protective cover affixable to the main supply pipe to overlie and protect the remaining severed portion of the Service T that contains the threaded plug.

* * * * *